US007024404B1

(12) United States Patent
Gerasoulis et al.

(10) Patent No.: US 7,024,404 B1
(45) Date of Patent: Apr. 4, 2006

(54) RETRIEVAL AND DISPLAY OF DATA OBJECTS USING A CROSS-GROUP RANKING METRIC

(75) Inventors: Apostolos Gerasoulis, Highland Park, NJ (US); Wei Wang, Edison, NJ (US); Hyun-Ju Seo, Somerset, NJ (US)

(73) Assignee: The State University Rutgers, New Brunswick, NJ (US)

( * ) Notice: Subject to any disclaimer, the term of this patent is extended or adjusted under 35 U.S.C. 154(b) by 524 days.

(21) Appl. No.: 10/156,336

(22) Filed: May 28, 2002

(51) Int. Cl.
*G06F 17/30* (2006.01)

(52) U.S. Cl. .................................. 707/3; 707/4; 707/10
(58) Field of Classification Search .................... 707/3, 707/4, 10
See application file for complete search history.

(56) References Cited

U.S. PATENT DOCUMENTS

| 6,192,401 | B1 * | 2/2001 | Modiri et al. ............... 709/220 |
| 6,285,999 | B1 * | 9/2001 | Page .............................. 707/5 |
| 6,334,131 | B1 * | 12/2001 | Chakrabarti et al. .......... 707/10 |
| 6,684,205 | B1 * | 1/2004 | Modha et al. .................. 707/3 |
| 6,862,586 | B1 * | 3/2005 | Kreulen et al. ................. 707/3 |

OTHER PUBLICATIONS

Haveliwala. T.H Topic-sensitive PageRank: a context-sensitive ranking algorithm for web search, Knowledge and Data Engineering, IEEE Transaction, Jul.-Aug., 2003, p. 784-796.*

Chirita et al. Finding Related Pages Using the Link Structure of the WWW, Web Intelligent, Sep. 20-24, 2004, p. 631-635.*

Greso et al. STED: a system for topic enumeration and distillation, Information Technology: Coding and Computing, Apr. 8-10, 2002, pp. 294-299.*

Kerschberg et al. A semantic taxonomy-based personalizable meta-search agent, Web Information System Engineering, Dec. 3-6, 2001.*

Soumen Chakrabarti, Intergrating the document object model with hyperlinks for enhanced topic distillation and information extraction, ACM Special Interest Group on Hypertext, Hypermedia and Web, 2001, p. 211-220. □□.*

(Continued)

*Primary Examiner*—Mohammad Ali
*Assistant Examiner*—Baoquoc N. To
(74) *Attorney, Agent, or Firm*—Blakely, Sokoloff, Taylor & Zafman; Stephen M. De Klerk

(57) ABSTRACT

Techniques to assign a ranking value to objects in a database such as a collection of cross referencing documents, the World-Wide Web or a hyperlinked database are described. The ranking value assigned to a given data object represents a cross-cluster strength metric and is a function of the object's importance across all groups or clusters in which the object is classified. The cross-cluster strength metric may be particularly beneficial in enhancing the performance of web-based search engines because it emphasizes the importance of objects that appear in multiple groups while de-emphasizing the importance of objects that, while highly linked within one or a few groups, are relatively unlinked to objects in other groups.

22 Claims, 1 Drawing Sheet

OTHER PUBLICATIONS

Behnak et al. Re-ranking search results uing network analysis a case study with google: a case study with Google, IBM Centre for Advanced Studies Conference, 2002, pp. 14,□□.*

Krishma et al. Improved algorithms for topic distillation in a hyperlinked envirionment, Annual ACM Conferernce on Research and Development in Information Retrieval, 1998, p. 104-111.*

Bharat, Krishna, Andrel Broder, Monika Henzinger, Puneet Kumar, and Suresh Venkatasubramanian. "The Connectivity Server: Fast Access to Linkage Information on the Web." http://decweb.ethz.ch/WWW7/1938/com1938.htm. pp. 1-13.

Bharat, Krishna, and Monika R. Henzinger. "Improved Algorithms for Topic Distillation in a Hyperlinked Environment." ACM, Inc.: Melbourne, Australia. 1998. pp. 1-9.

Brin, Sergey, Lawerence Page. "The Anatomy of a Large-Scale Hypertextual Web Search Engine." http://www7.scu.edu.au/programme/fullpapers/1921/com1921.htm. pp. 1-20.

Chakrabarti, Soumen, Byron E. Dom, Daivd Gibson, Ravi Kumar, Prabhakar Raghavan, Sridhar Rajagopalan, and Andrew Tomkins. "Experiments in Topic Distillation." http://www/almaden.ibm.com/cs/k53/abstract.html. pp. 1-6.

Chakrabarti, Soumen, Byron Dom, Prabhakar Raghavan, Sridhar Rajagopalan, Daivd Gibson, and Jon Kleinberg. "Automatic Resource Compilation by Analyzing Hyperlink Structure and Associated Text." http://www7.scu.edu.au/programme/fullpapers/1898/com1898.html. pp. 1-14.

Davison, Brian D., Apostolos Gerasoulis, Konstantinos Kleisouris, Yingfang Lu, Hyun-ju-Seo, Wei Wang, and Baohua Wu. "DiscoWeb: Applying Link Analysis to Web Search." http://www.cs.rutgers.edu/~davison/pubs/www99.html. pp. 1-4.

Dongarra, Jack J., Jeremy Du Croz, and Richard J. Hanson. "An Extended Set of FORTRAN Basic Linear Algebra Subprograms." ACM Transactions on Mathematical Software, vol. 14, No. 1, Mar. 1988. pp. 1-17.

Gibson, David, Jon Kleinberg, and Prabhakar Raghavan. "Inferring Web Communities from Link Topology." http://www.cs.cornell.edu/home/kleinber/ht98.ps. pp. 1-17.

Kleinberg, Jon M. "Authoritative Sources in a Hyperlinked Environment." http://www.cs.cornell.edu/home/kleinber/auth.pdf. pp. 1-34.

Mizruchi, Mark S., Peter Mariolis, Michael Schwartz, and Beth Mintz. Techniques for disaggregating centrality scores in social networks. In N. B. Turna, editor, Sociological Methodology, pp. 26-48. Jossey-Bass, San Francisco, 1986.

Ng, Andrew Y., Alice X. Zhang, and Michael I. Jordan. Stable algorithms for link analysis. Proc. 24th International Conference on Research and Development in Information Retrieval (SIGIR), 2001.

Page, Lawrence, Sergy Brin, Rajeev Motwani, Terry Winograd. "The PageRank Citation Ranking: Bringing Order to the Web." http://dbpubs.stanford.edu:8090/pub/1999-66. MS Power Point Presentation. Jan. 29, 1998. pp. 1-20.

* cited by examiner

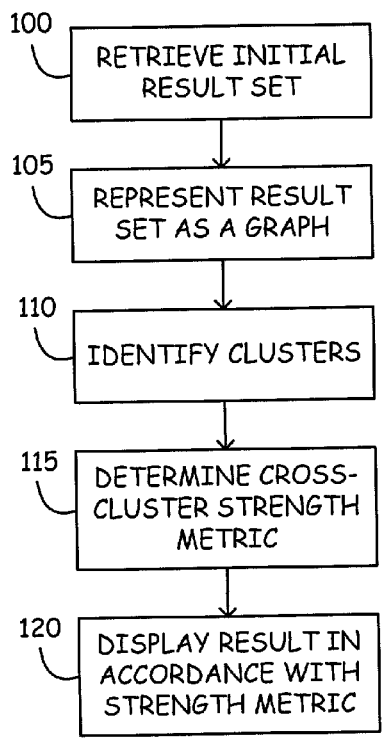
FIG. 1
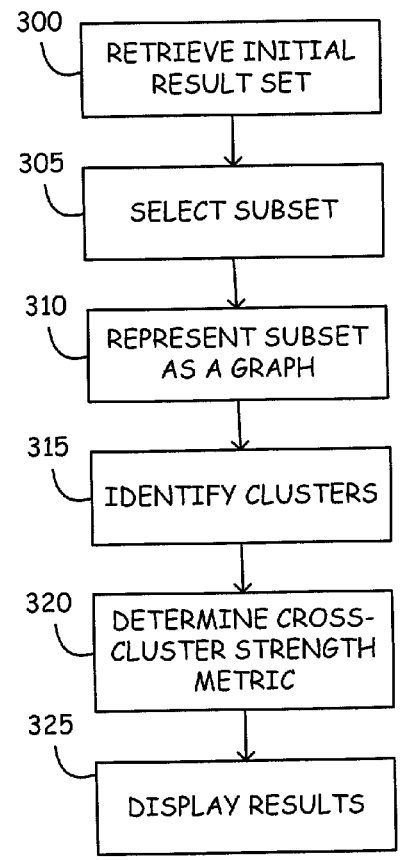
FIG. 3
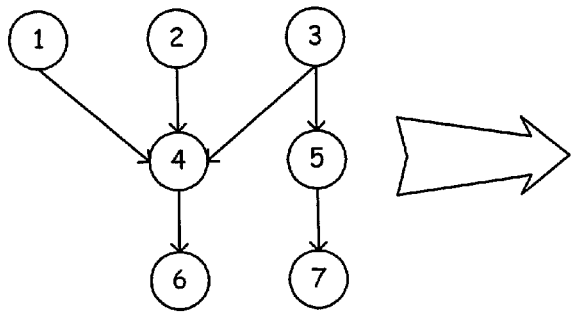
FIG. 2A
$$A = \begin{bmatrix} 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 1 & 1 & 1 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \end{bmatrix}$$
FIG. 2B

RETRIEVAL AND DISPLAY OF DATA OBJECTS USING A CROSS-GROUP RANKING METRIC

STATEMENT REGARDING GOVERNMENT SUPPORT

This invention was supported in part by the Defense Advanced Research Projects Agency under contract number Z883601. The Government has certain rights in the invention.

BACKGROUND

The invention relates generally to techniques for analyzing database queries. More particularly, the invention provides techniques to assign a rank, weight or strength metric to data objects based on the object's membership in multiple groups.

As the size of the World-Wide Web (the "Web") has increased, so has its importance as a data repository. It is currently estimated that the Web comprises approximately 150 million hosts and more than two billion web pages and is growing at a rate of approximately 100% per year. One aspect of this growth is that users can no longer browse multiple sources for the same or related information—there is simply to much of it. Thus, any search and retrieval technique applied to such a large and highly interconnected database must return only relevant results. The more relevant the returned results, the "better" the search.

Current search engines use a variety of techniques to determine what retrieved objects (e.g., documents) are relevant and which are not. For example, documents can be ranked based on (1) how many times a user's search terms appear in the document, and/or (2) how close the search terms are to the beginning of the document, and/or (3) the presence or absence of the search terms in the document's title or other specified headings. More recent search engines assign a rank for each page (that is, each page identified by a search) based on a vector space analysis scheme. Such schemes cluster groups of retrieved pages based on the number of references those pages receive (in-bound links) and/or the number of pages those pages reference (out-bound links). Recent improvements of these basic techniques assign a rank value to each page in terms of both the number of in-bound links it has and the importance of the pages providing those in-bound links (i.e., the quality of the out-bound links from predecessor documents). The "Google" search engine at http://www.google.com is one search engine employing this method.

While these techniques provide ranking metrics that are an improvement over prior text weighting methods, they are typically static (that is, they are computed a priori) and fail to account for the importance of documents that participate in multiple groups. Thus, it would be beneficial to provide a mechanism to dynamically determine the relevancy of a retrieved data object based not only on its membership in one group, but to account for its importance as a result of its membership in multiple groups.

SUMMARY

In one embodiment the invention provides a method to rank a data object retrieved from a database. The method includes obtaining a group-value for each group in which the data object is a member, obtaining an object-value associated with the data object for each group in which the data object is a member, combining the group-values and the object-values in a group-by-group basis to assign a scalar strength score to the data object, and processing the data object according to the strength score. Methods in accordance with the invention may be embodied in program instructions and stored in any media that is readable and executable by a programmable control device.

BRIEF DESCRIPTION OF THE DRAWINGS

FIG. 1 shows, in flowchart form, the general outline of a search, rank and display technique in accordance with the invention.

FIGS. 2A and 2B show the connectivity graph and associated connection matrix for an illustrative web-based query.

FIG. 3 shows, in flowchart form, an illustrative use of a cross-cluster strength metric in accordance with the invention.

DETAILED DESCRIPTION

The invention relates generally to database retrieval and display operations and more particularly to techniques for ranking or weighting individual data objects within a result set based on that data object's membership in a plurality of groups. Techniques in accordance with the invention advantageously emphasize the rank or order of data objects (web pages and documents, for example) that appear in a plurality of groups or clusters in the result set compared to those data objects that appear in fewer groups or clusters.

The following descriptions are presented to enable a person of ordinary skill in the art to make and use the invention and are provided in the context of a web-based search engine. Various modifications to the described embodiments will be readily apparent to those skilled in the art and the general principles defined herein may be applied to other embodiments and applications without departing from the spirit and scope of the invention. Accordingly, the present invention is not intended to be limited to the specific embodiments described and, in particular, to a web-based search engine using authority-hub strength metrics, but is to be accorded the widest scope consistent with the principles and features disclosed herein.

The general outline of a search, rank and display technique in accordance with the invention is shown in FIG. 1. To begin, a query is used to retrieve an initial set of data objects that relate to the query (block 100). In one embodiment, a user-supplied query is used to retrieve a set of web pages where each web page relates to at least one word in the query. For example, each web page in the initial result set may include one or more of the words comprising the search query. The search may also return data objects related to the user-supplied query through, for example, synonym or root relationships. In another embodiment, a user-supplied query may include search constraints such as, for example, how close each query term must appear in a data object with respect to one another, and date limits or ranges. If the initial result set comprises less than a specified number of data objects, all of the initial result sets may be chosen for continued processing. If, on the other hand, the initial result set comprises more than the specified number of data objects, the retrieved data objects may be ranked in accordance with a convenient metric and the "top N" ranked data objects selected for continued processing. In one embodiment, if more than 'N' data objects are initially returned, those 'N' data objects having the highest total number of incoming links (referred to as the "Global Link Popularity")

are selected for continued processing. (In a web-based environment, it will be recognized that a web page's Global Link Popularity value is query independent—being only a function of the page's notoriety within the World Wide Web). In another embodiment, the 'N' data objects having the highest text-based rank values are selected for continued processing, where text relevancy may be computed in any desired fashion. By way of example, if a user query results in an initial set comprising more than 200,000 objects, the objects are ranked in accordance with their Global Link Popularity and the first 15,000 objects are selected for continued evaluation. Other selection techniques or ranking schemes, of course, may be used to determine that set of initially retrieved data objects which are subsequently processed.

Data objects identified during the acts of block 100 are then represented as a directed graph typically, but not necessarily, in the form of a "connection matrix" (block 105). The resulting graph is then partitioned into (often overlapping) clusters using any clustering technique (block 110). Illustrative clustering techniques include, but are not limited to, defining clusters based on common predecessor nodes (referred to as authority-based clusters), common successor nodes (referred to as hub-based clusters) and total number of predecessor or successor nodes (referred to as popularity-based clusters). As part of the selected clustering technique or as a follow-up action, each object in a cluster is assigned a value that indicates its importance within the cluster (an "intracluster" weight). In addition, each cluster is assigned a value that indicates its importance relative to the other clusters (a "cluster weight"). The precise method of assigning these values will depend, of course, on the selected clustering technique. For example, authority-based and hub-based clustering techniques define clusters in terms of eigenvectors which naturally assign intracluster weight values to each member in the eigenvector, and eigenvalues which naturally represent cluster weight values. Popularity based clustering techniques may assign intracluster weights based on, for example, the number of times the object has been retrieved (e.g., in a database implementation) in a specified period of time. Similarly, popularity based clustering techniques may assign cluster weights based on the number of data objects in the cluster relative to the total number of data objects in the result set. Either or both of these values may be normalized for ease of computation.

When vector-space clustering techniques are used (i.e., those that generate eigenvector-eigenvalue pairs), any desired method may be used to solve for the eigenvector-eigenvalue pairs associated with the connection matrix. It has been found beneficial, however, to use sub-space iteration techniques as embodied in the publicly available software routines known as LAPACK. (A user guide is available at http://www.netlib.org/lapack/lug/lapack_lug.html.) In addition, it has been found advantageous to use specialized routines such as those described by Dongarra et al. ("An extended set of FORTRAN Basic Linear Algebra Subprograms," ACM Trans. Math. Soft., Vol. 14, No. 1, 1988, pp. 1–17).

In some embodiments, the complexity of the connectivity matrix associated with the data objects selected during block 105 may be reduced to improve the speed at which the clusters can be identified. For example, connections (e.g., links) between selectively identified data objects may be eliminated. In a web-based embodiment, the initial result set determined during block 100 may be partitioned into two groups. Those web pages in the first group have at least one query word in their title section, while those web pages in the second class do not. In this embodiment, links between pages in the second class may be pruned (deleted). In another web-based embodiment, the result set may be partitioned into three classes. Those web pages in the first class may have all the query words in consecutive order (i.e., the complete query phrase precisely as input by the user), while those in the second class have all the query words but only within 'b' words of one another and those in the third class do not have all the query words within 'b' words. In this embodiment, links between class three pages may be deleted. One benefit of pruning links is that it can result in a connection matrix representation of the result set graph (block 105) that is substantially more sparse than had this step not been taken. This, in turn, reduces the computational effort required to cluster the pages and, if the basis on which the partitions are made relate to relevancy, do not substantially harm the resulting page clustering operation (block 110).

Once clusters are defined and intracluster and cluster weight values are assigned, a strength metric is determined that ranks each data object across all clusters in accordance with the selected clustering technique (block 115). For example, if clusters are defined in block 110 using an authority-based scheme, a strength metric in accordance with the invention will assign a value to each data object that represents the weighted importance of that object's authority across all clusters. Similarly, if clusters are defined in block 110 using a hub-based scheme, a strength metric in accordance with the invention will assign a value to each data object that represents the weighted importance of the authority of that object's successor objects across all clusters. Further, if clusters are defined in block 110 based on their popularity, a strength metric in accordance with the invention will assign a value to each data object that represents the weighted popularity of that object across all clusters.

For discussion purposes, let:

C represent an (n×n) matrix whose columns correspond to, or identify, the clusters determined during the acts of block 110;

$\vec{c}_i$ represent the ith column of matrix C, an (n×1) eigenvector whose non-zero elements indicate membership in the ith cluster—if the jth element in vector $\vec{c}_i$ ($c_i^j$) is non-zero, the jth data object is a member of the ith cluster, otherwise the jth data object is not a member of the ith cluster;

$\vec{\lambda}$ represent an (n×1) vector whose elements correspond to the cluster weight values (e.g., eigenvalues) assigned during the acts of block 110;

$\lambda_i$ represent the cluster weight value associated with the ith cluster or eigenvector (the ith eigenvalue);

$\vec{s}$ represent an (n×1) vector whose elements correspond to the cross-cluster strength metric in accordance with the acts of block 115;

$s_i$ represent the strength value assigned to the ith data object—the ith element of vector $\vec{s}$; and a represent a weighting factor.

With these general definitions, a strength metric ($\vec{s}$) in accordance with the invention may be defined as:

$$\vec{s} = \sum_{i=1}^{n} |\lambda_i|^a \times |\vec{c}_i|.$$

In expanded form this result may be written as:

$$\begin{bmatrix} s_1 \\ s_2 \\ \vdots \\ s_n \end{bmatrix} = |\lambda_1|^a \times \begin{bmatrix} \left| c_1^1 \right| \\ \left| c_1^2 \right| \\ \vdots \\ \left| c_1^n \right| \end{bmatrix} + \ldots + |\lambda_n|^a \times \begin{bmatrix} \left| c_n^1 \right| \\ \left| c_n^2 \right| \\ \vdots \\ \left| c_n^n \right| \end{bmatrix}.$$

Weighting factor 'a' is included to allow control over the amount of importance attributed to cross-cluster membership of individual data objects. For example, when a=0, the $\vec{s}$ metric value associated with any given data object reduces to a linear sum of that object's previously determined intracluster values (see block 110). In other words, when a=0 each cluster is given equal weight in determining the importance of any given data object (i.e., cluster weight ranking is ignored). On the other hand, when a≠0, a strength metric in accordance with the invention emphasizes (when a≧1) or deemphasizes (when 0<a<1) the importance of those data objects that appear in multiple clusters relative to those data objects that appear in fewer clusters.

Thus, a metric in accordance with the invention generates a weighted value (hereinafter, referred to as the object's "strength") for each data object, such strength being a function of not only the object's importance within a cluster, but also its relative importance in other clusters. One of ordinary skill in the art will recognize that the strength metric may be normalized. For example, while the invention is not so limited, the embodiment described above uses the L2 or Euclidian norm. One illustrative normalization technique is to divide the computed strength metric values by the largest strength metric value. In another normalization technique, the strength metric is determined based on a weighted vector addition process (that is, absolute-value functions are not used or, if used, are enforced after the vector summation operation). One of ordinary skill in the art will further recognize that weighting factor 'a' may be a constant multiplier of a cluster's cluster weight (eigenvalue) rather than a power thereof. Weighting factor 'a' could also be expressed as a function of, for example, the total number of clusters and/or the total number of data objects. In addition, a strength metric in accordance with the invention may use algebraic operators other than summation and absolute value operations. In all these approaches, an important feature is that intracluster and cluster weight values for each object are combined across multiple clusters (although not necessarily all clusters as shown in the example above).

Referring again to FIG. 1, once a cross-cluster strength metric is determined, the objects (or indicators thereof) may be displayed for the user (block 120). In a web-based environment the title, a hyperlink or Uniform Resource Locator (URL) and perhaps a brief description of the page (data object) may be displayed for the user in a most-significant to least-significant order.

One benefit of a retrieval and display technique in accordance with the invention is that individual objects are ranked and displayed based on their strength (a global measure of importance) and not just their membership in one cluster.

One of ordinary skill in the art will recognize that prior art cluster-based ranking techniques focus on identifying clusters and, once this is done, select for display those objects that belong to the most significant cluster.

Another benefit of a retrieval and display technique in accordance with the invention is that the strength of objects that participate in multiple clusters is emphasized over the strength of objects that participate in fewer clusters. This is important in a web-based implementation when one recognizes that highly interconnected but isolated clusters are typical of (1) spam sites and (2) personal sites that are relatively unused by the larger web-surfing community. The interconnected nature of these sites is totally dependent upon the design and implementation of the site and is not affected by the use or access of those pages by other users (represented by hyperlinks between pages, for example). Thus, without the ability to deemphasize such sites their high internal connectivity may skew the apparent importance of the individual pages comprising the sites and, consequently, the displayed search results may be skewed to irrelevant sites.

A simple web-based implementation using an authority-hub clustering/ranking scheme will now be described to further clarify the above presentation. For this example, the initial result set (see block 100) for a user's query comprises 7 objects, web pages 1 through 7. The connectivity graph (see block 105) for this result set is shown in FIG. 2A and the associated connectivity matrix 'A' is shown in FIG. 2B. For simplicity, the elements of connectivity matrix A, represented as $a_{ij}$, are defined as having a value of 1 if node 'i' is related to node 'j' and 0 otherwise. One of ordinary skill in the art will recognize that other values may be used. For example, elements of connectivity matrix A may be assigned values between 0 (representing no connection) and 1 (representing maximum connectivity).

Using an authority-hub clustering technique such as that introduced by Kleinberg et al. ("Authoritative Sources in a Hyperlinked Environment," 9th ACM-SIAM Symposium on Discrete Algorithms, 1998), the connectivity matrix A of FIG. 2B leads to the following two eigenvector/eigenvalue equations:

$$\lambda \vec{a} = (AA^T)\vec{a} \text{ and } \lambda \vec{h} = (A^TA)\vec{h}, \text{ where}$$

A represents the (n×n) connectivity matrix of FIG. 2B and $A^T$ its transpose;

λ represents an eigenvalue of the system;

$\vec{a}$ represents a (n×1) eigenvector for the authorities of the system; and $\vec{h}$ represents a (n×1) eigenvector for the hubs of the system.

One of ordinary skill in the art will recognize that eigenvectors $\vec{a}$ and $\vec{h}$ represent clusters based on the authority and hub metrics respectively, that the value of individual elements in each eigenvector represents that element's relevance (based on either the authority or hub metric) relative to the eigenvector's other elements and that the eigenvalue λ associated with a particular eigenvector represents that eigenvector's importance relative to the other eigenvectors (i.e., a cluster weight).

Solving initially for those eigenvector-eigenvalue pairs associated with the authority-based equations yield:

$$\vec{a}_1 = \begin{bmatrix} 1 \\ 0 \\ 0 \\ 0 \\ 0 \\ 0 \\ 0 \end{bmatrix}; \vec{a}_2 = \begin{bmatrix} 0 \\ 1 \\ 0 \\ 0 \\ 0 \\ 0 \\ 0 \end{bmatrix}; \vec{a}_3 = \begin{bmatrix} 0 \\ 0 \\ 1 \\ 0 \\ 0 \\ 0 \\ 0 \end{bmatrix}; \vec{a}_4 = \begin{bmatrix} 0 \\ 0 \\ 0 \\ 0.92 \\ 0.38 \\ 0 \\ 0 \end{bmatrix}; \vec{a}_5 = \begin{bmatrix} 0 \\ 0 \\ 0 \\ 0.38 \\ -0.92 \\ 0 \\ 0 \end{bmatrix};$$

$$\vec{a}_6 = \begin{bmatrix} 0 \\ 0 \\ 0 \\ 0 \\ 0 \\ 1 \\ 0 \end{bmatrix}; \vec{a}_7 = \begin{bmatrix} 0 \\ 0 \\ 0 \\ 0 \\ 0 \\ 0 \\ 1 \end{bmatrix}; \text{ and } \vec{\lambda} = \begin{bmatrix} 0 \\ 0 \\ 0 \\ 3.41 \\ 0.58 \\ 1 \\ 1 \end{bmatrix},$$

where $\vec{a}_i$ represents the ith authority-based eigenvector and $\vec{\lambda}$ represents the vector of eigenvalues associated with the authority-based eigenvectors $\vec{a}_1$ through $\vec{a}_7$.

Computing cross-cluster strength vector $\vec{s}$ in accordance with the invention for weighting factor a=1 yields:

$$\vec{s} = 3.41\vec{a}_4 + 0.58\vec{a}_5 + \vec{a}_6 + \vec{a}_7 = [0\ 0\ 0\ 3.37\ 1.84\ 1\ 1]^T,$$

where superscript 'T' represents the transpose operator. In accordance with the invention, pages 4, 5, 6 and 7 would be displayed to the user. In contrast, prior art cluster-based retrieval and display techniques would have selected that eigenvector/cluster having the largest eigenvalue (i.e., $\vec{a}_4$) and simply displayed the elements of that cluster—pages 4 and 5. Thus, even in this very simple example, the user would not have been presented pages 6 and 7 even though they are relevant in the sense that they are linked to highly authoritative pages. The benefit of determining the influence of a page that appears in many clusters becomes more and more pronounced as the number of pages (data objects) and their interconnectivity increases. The World-Wide Web is one environment in which the use of a cross-cluster strength metric can yield significantly different and improved retrieval results.

It will be recognized that the same solution technique may be applied to the hub-based system $\lambda\vec{h} = (A^T A)\vec{h}$, such that those hubs having the highest strength may also be displayed. Since strong hubs represent sources relied upon by a plurality of authoritative nodes/pages (i.e., nodes/pages that have a relatively high strength value), the display of hubs in accordance with the invention (either alone or in combination with the display of authoritative pages as shown in the example above) gives the user a secondary list of pages that, in general, may act as "portals" for additional information on the subject matter the user is searching for. Because techniques in accordance with the invention evaluate the rank of a hub across multiple clusters, it is more likely to identify those hub pages that reference pages across multiple clusters than prior art techniques.

In one application, a cross-cluster strength metric in accordance with the invention may be used to determine what pages to display, and in what order to display them, in response to a user query directed to the World-Wide Web. Referring to FIG. 3, a user query may be directed to a collection of identified and indexed web pages that results in the return of an initial result set comprising textually relevant pages (block 300). In one embodiment, the collection of web pages comprises more than six hundred million (600,000,000) web pages and the initial result set comprises more than one hundred thousand (100,000) web pages. One of ordinary skill in the art will recognize that the number of initially identified pages is highly dependent upon the user's search query. For example, the query "abuse" may return several hundred thousand pages while the query phrase "John F. Kennedy" may return only a few thousand.

If the initial result set comprises more than a specified number of pages, say 'N' where in one embodiment N=15,000, the pages are ranked in accordance with their textual relevancy (using any technique desired) and the top N are selected for further processing (block 305). If, on the other hand, the initial result set comprises N or fewer pages, the entire initial result set may be used. Once a set of pages is chosen for further processing, their interconnections are represented as a graph (block 310). The resulting graph structure is partitioned into a number of, possibly overlapping, groups or clusters in accordance with any desired vector-space clustering technique (block 315).

Following cluster determination, and particularly in the case of an authority/hub-based clustering technique, a cross-cluster strength metric for both the authority and hub metrics may be determined in accordance with the invention as described above (block 320) and the results displayed (block 325). In one embodiment, a specified number of authority pages are displayed (highest strength to lowest strength) in a first portion of a display device and a specified number of hub pages are displayed (highest strength to lowest strength) in a second portion of the display device.

Various changes in the details of the illustrated operational methods are possible without departing from the scope of the following claims. For instance, different specific techniques (e.g., equations) from those illustrated herein to determine a data object's cross-cluster strength metric may be used without departing from the claimed invention. It will also be recognized by those of ordinary skill in the art of computer programming that the methods of FIGS. 1 and 3 may be embodied as a series of instructions organized into one or more computer programs which are executable by a programmable control device. A programmable control device may be a single computer processor, a plurality of computer processors coupled by a communications link, or a custom designed state machine. Custom designed state machines may be embodied in a hardware device such as a printed circuit board comprising discrete logic, specially designed application specific integrated circuits (ASICs), or integrated circuits such as field programmable gate arrays (FPGAs). Storage devices suitable for tangibly embodying computer programs include all forms of non-volatile memory including, but not limited to: semiconductor memory devices such as electrically programmable read only memory (EPROM), electrically erasable programmable read only memory (EEPROM), and flash devices; magnetic disks (fixed, floppy, and removable); other magnetic media such as tape; and optical media such as CD-ROM disks.

As discussed above, one benefit of the invention is that the use of a cross-cluster strength metric aggregates and weights the contribution of a data object across all clusters in which it is a member. This approach tends to stabilize a page's ranking (e.g., strength) and reduces the impact of clusters that comprise highly interconnected objects but which are relatively unconnected to other clusters. Another benefit is that cross-cluster strength metrics in accordance with the invention may be computed in real-time (i.e., dynamically) and is, therefore, very adaptive to specific user queries. This feature of the invention also avoids the need to pre-compute strength or ranking values for queries and/or individual data objects (e.g., web pages).

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A computer implemented method to rank a data object, wherein the data object is a member of a plurality of groups, the method comprising:
    obtaining a group-value for each of the plurality of groups in which the data object is a member, the group-value representing a first relationship between a respective group with a respect to a remainder of the plurality of groups;
    obtaining an object-value associated with the data object for each group in which the data object is a member, the object-value representing a second relationship between the data object with respect to a remainder of the data objects within each group;
    obtaining a weighting factor value associated with the data object;
    combining the group-values and the object-values and the weighting factor in a group-by-group fashion to assign a scalar strength score to the data object, wherein the act of combining the group-values, the object-values and the weighing factor comprising generating a scalar strength as $$\sum_{i=1}^{n} |gi|^w \times |oi|,$$

where "g" represents a group-value, "o" represents an object value, "w" represents the weighting factor, and "i" represent a value that runs from 1 to "n" where "n" is the number of groups in which the data object is a member; and
    processing the data object according to the strength score.

2. The method of claim 1, wherein the groups, group-values and object-values are determined in accordance with a vector-space clustering technique.

3. The method of claim 1, wherein the act of obtaining a group-value comprises obtaining an eigenvalue associated with each group in which the data object is a member.

4. The method of claim 1, wherein the act of obtaining an object-value comprises obtaining that eigenvector value associated with the data object in each of the groups in which the data object is a member.

5. The method of claim 1, wherein the act of obtaining a weighting factor comprises selecting a value between zero (0) and one (1).

6. The method of claim 1, wherein the weighting factor is assigned a value of one (1).

7. The method of claim 1, wherein the act of act of combining the group-values, the object-values and the weighting factor further comprises normalizing the scalar strength score.

8. The method of claim 1, wherein the act of processing the data object comprises displaying an identifier representing the data object with identifiers representing other data objects in the order of their strength score.

9. A computer implemented method to rank and display a plurality of linked documents, the method comprising:
    identifying a plurality of linked documents;
    representing the interconnectivity of the linked documents as a graph;
    clustering the linked documents in accordance with a selected vector-space technique to obtain one or more eigenvectors and an equal number of eigenvalues, each eigenvector identifying a cluster whose non-zero elements identify those linked documents that are members of that cluster, each eigenvalue associated with a single eigenvector;
    obtaining a weighting factor;
    determining a scat strength score for at least some of the plurality of linked documents in accordance with $$\sum_{i=1}^{n} |\lambda_i|^w \times |\vec{e}_i|,$$

where "i" represents a value that runs from 1 to "n" where "n" is the number of clusters, "$\lambda_i$" represents the ith eigenvalue, "$\vec{e}_i$" represents the ith eigenvector, and "w" represents the weighting factor; and
    displaying a selected number of the linked documents in the order of their strength score.

10. The method of claim 9, wherein the act of representing the interconnectivity of the linked documents as a graph comprises representing the connectivity between two linked documents as a real value between zero (0) and one (1), where 0 represents no link and 1 represents a maximally strong link.

11. The method of claim 9, wherein the act of clustering the linked documents in accordance with a selected vector-space technique comprises using an authority and hub-based clustering technique.

12. The method of claim 9, wherein the weighting factor is assigned a value between zero (0) and one (1).

13. The method of claim 12, wherein the weighting factor is assigned a value of one (1).

14. The method of claim 9, wherein the act of act of determining a scalar strength score further comprises normalizing the scalar strength score.

15. A computer program storage device, readable by a programmable control device, comprising instructions stored on the program storage device for causing the programmable control device to rank a data object wherein the data object is a member of a plurality of groups in accordance with the following acts:
    obtaining a group-value for each of the plurality of groups in which the data object is a member, the group-value representing a first relationship between a respective group with respect to a reminder of the plurality of groups;
    obtaining an object-value associated with the data object for each group in which the data object is a member, the object-value representing a second relationship between the data object with respect to a remainder of the data objects within each group;

obtaining a weighting factor value associated with the data object;

combining the group-values and the object-values and the weighting factor in group-by-group fashion to assign a scalar strength score to the data object, wherein the act of combining the group-values, the object-values and the weighing factor comprising generating a scalar strength as $$\sum_{i=1}^{n} |gi|^w \times |oi|,$$

where "g" represents a group-value, "o" represents an object-value, "w" represents the weighting factor, and "i" represents a value that runs from 1 to "n" where "n" is the number of groups in which the data object is a member; and Processing the data object according to the strength score.

16. The program storage device of claim 15, wherein the instructions to obtain group-values and object-values comprise instructions to obtain such values in accordance with a vector-space clustering technique.

17. The program storage device of claim 15, wherein the instructions to obtain a group-value comprises instructions to obtain an eigenvalue associated with each group in which the data object is member.

18. The program storage device of claim 15, wherein the instructions to obtain an object-value comprise instructions to obtain an eigenvector value associated with the data object in each of the groups in which the data object is a member.

19. The program storage device of claim 15, wherein the instructions to obtain a weighting factor comprise instructions to select a value between zero (0) and one (1).

20. The program storage device of claim 19, wherein the weighting factor is assigned a value between zero (0) and one (1).

21. The program storage device of claim 19, wherein the instructions to combine the group-values, the object-values and the weighting factor further comprise instructions to normalize the scalar strength score.

22. The program storage device of claim 15, wherein the instructions to process the data object comprise instructions to display an identifier representing the data object with identifiers representing other data objects in the order of their strength score.

* * * * *